Feb. 23, 1937.  J. A. McBRADY  2,071,644
COMBINATION TRUNK, BED, AND TENT
Filed Jan. 23, 1935  5 Sheets—Sheet 1

Inventor
John A. McBrady
By Caswell Lagaard
Attorneys

Feb. 23, 1937. J. A. McBRADY 2,071,644
COMBINATION TRUNK, BED, AND TENT
Filed Jan. 23, 1935 5 Sheets—Sheet 5

Fig. 5

Inventor
John A. McBrady
By Caswell & Lagaard
Attorneys

Patented Feb. 23, 1937

2,071,644

UNITED STATES PATENT OFFICE 2,071,644

COMBINATION TRUNK, BED, AND TENT

John A. McBrady, Valley City, N. Dak., assignor of one-half to Ella M. Mangan, Valley City, N. Dak.

Application January 23, 1935, Serial No. 3,026

13 Claims. (Cl. 190—12)

My invention relates to combination trunks, beds and tents and has for an object to provide a structure of such nature adapted to be converted into a trunk for ready transportation or to be quickly converted into a tent provided with beds for sleeping.

Another object of the invention resides in providing a structure of the class described which may be permanently attached to and carried by an automobile and which in erected position may be partly supported by the automobile or which may be used independently thereof if desired.

An object of the invention resides in providing a trunk constructed in two sections, said sections comprising a front and back and complemental walls issuing outwardly therefrom and forming in conjunction therewith ends and a bottom for the trunk.

A feature of the invention resides in providing a rack attached to the rearward portion of the automobile and in hingedly connecting the back of the rear trunk section in proximity to the bottom wall thereof to said rack to permit said trunk section to swing from a position in which the back is vertical to a horizontal position.

Another object of the invention resides in connecting said trunk sections together at the upper ends of the same and in proximity to the line of joinder of the walls thereof, whereby the front trunk section may swing from a position in which the front is vertical to a position in which the front thereof lies in continuation of the back of the first named section and is substantially horizontal.

An object of the invention resides in providing one or two bed bottoms carried by the trunk sections, said bed bottoms being collapsible and being adapted to extend outwardly from the trunk sections when in extended position and to be confined wholly within the respective trunk sections to which they are attached when in collapsed position.

Another object of the invention resides in constructing the bed bottoms in two parts adapted to be folded into extended coplaner relation or to be folded into overlying relation whereby the respective bed bottoms may be received within the respective trunk sections to which they are attached.

An object of the invention resides in the specific manner in which the trunk sections and bed bottoms are connected together.

A still further object of the invention resides in constructing the trunk sections with end panels hingedly or otherwise connected thereto and adapted when in erected position to form a support for the tent covering.

A feature of the invention resides in constructing the end panels with wings hingedly or otherwise connected thereto for holding the tent covering in erected position and for partially supporting the bed bottoms when in extended position.

A still further object of the invention resides in constructing one or both of the end panels with openings serving as doorways and in providing U-shaped uprights extending upwardly therefrom and supporting the tent covering.

A feature of the invention resides in hingedly connecting the end panels to the end sections in such a manner as to cause the same to swing up against the bottom walls of the trunk sections and in further utilizing the ridge pole of the tent for maintaining said panels in such position.

Other objects of the invention reside in the novel combination and arrangement of parts and in the details of construction hereinafter illustrated and/or described.

In traveling by automobile and in camping, particularly in sparsely populated country, it becomes highly desirable to be able to carry a tent and suitable sleeping equipment on the automobile so that sleeping accommodations may be readily and quickly provided whenever desired. Heretofore it has been customary, where such conveniences are desired, to utilize a trailer for the purpose. It has been found, however, that it is extremely inconvenient and awkward to use a trailer and also that more fuel is required. The present invention forms an extremely simple and practical construction for such purpose and when collapsed provides a trunk for containing all of the parts of the tent and sleeping equipment which may be carried on the automobile and when erected provides a complete tent with suitable sleeping accommodations.

Figures 1, 6, 7, 8, 9:
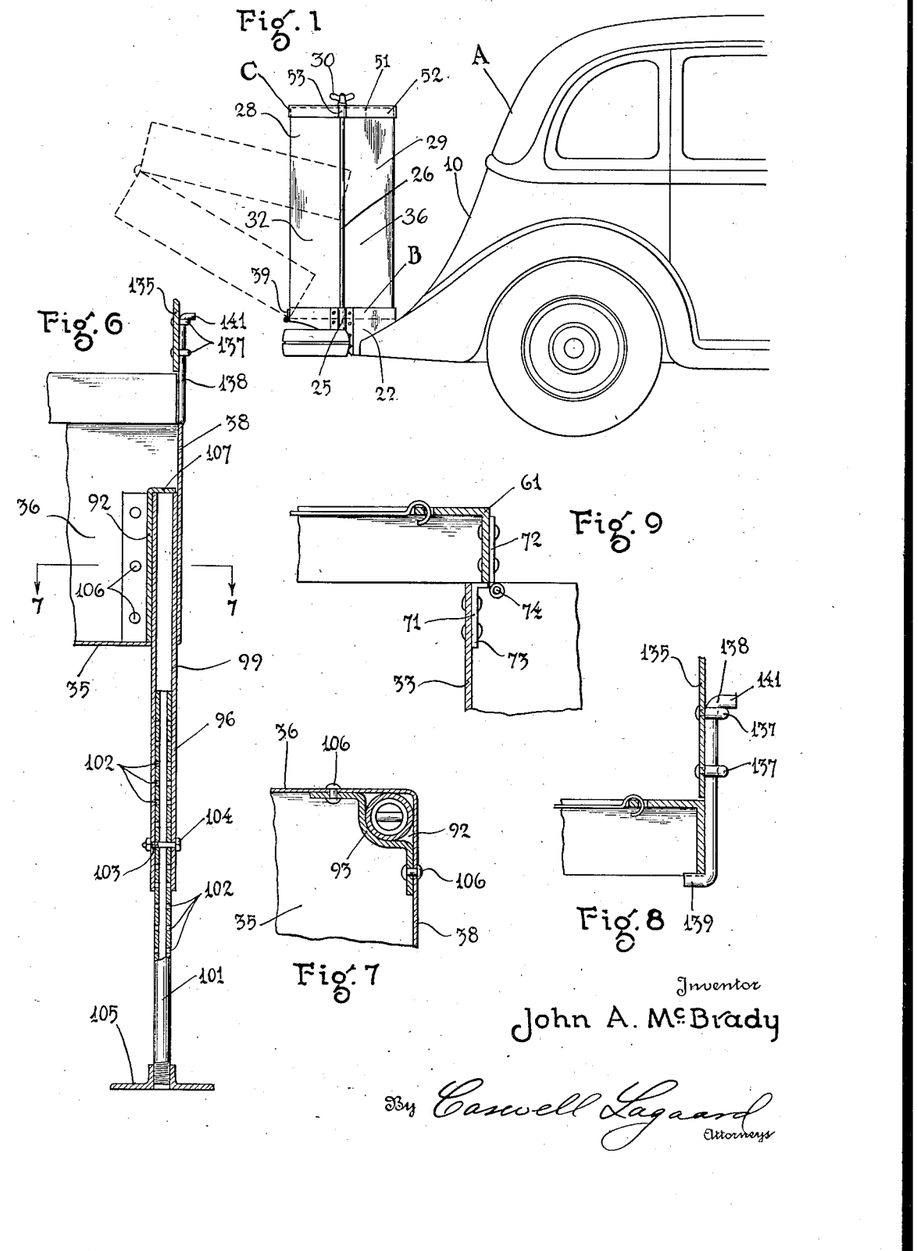
Fig. 1 is a side elevational view of the rear portion of a motor vehicle showing my invention applied thereto and illustrating the trunk in folded position with the other parts of the invention contained therein.
Fig. 6 is an elevational sectional view taken through one of the legs of the invention substantially on line 6—6 of Fig. 3.
Fig. 7 is a plan sectional view taken on line 7—7 of Fig. 6 and drawn to a somewhat larger scale.
Fig. 8 is an elevational sectional view taken on line 8—8 of Fig. 3.
Fig. 9 is an elevational sectional view taken on line 9—9 of Fig. 3.
Figure 3:
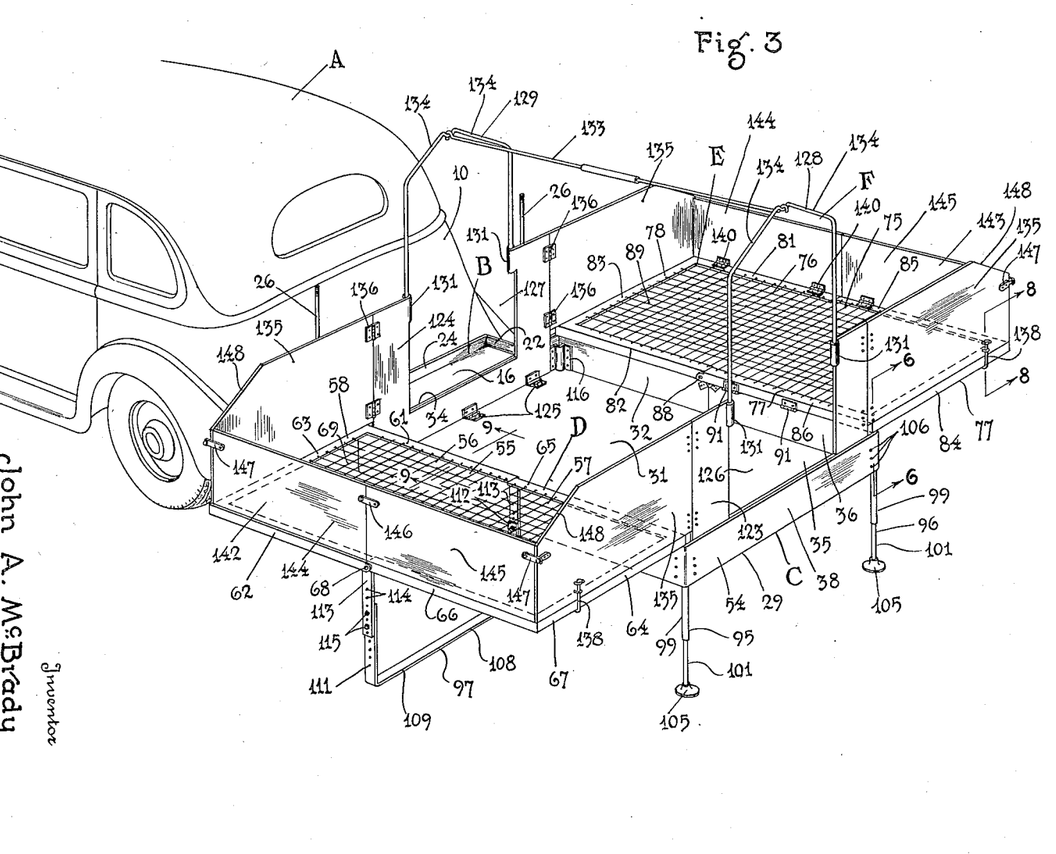
Fig. 3 is a perspective view of the invention in extended position with the tent covering removed.
Figure 5:
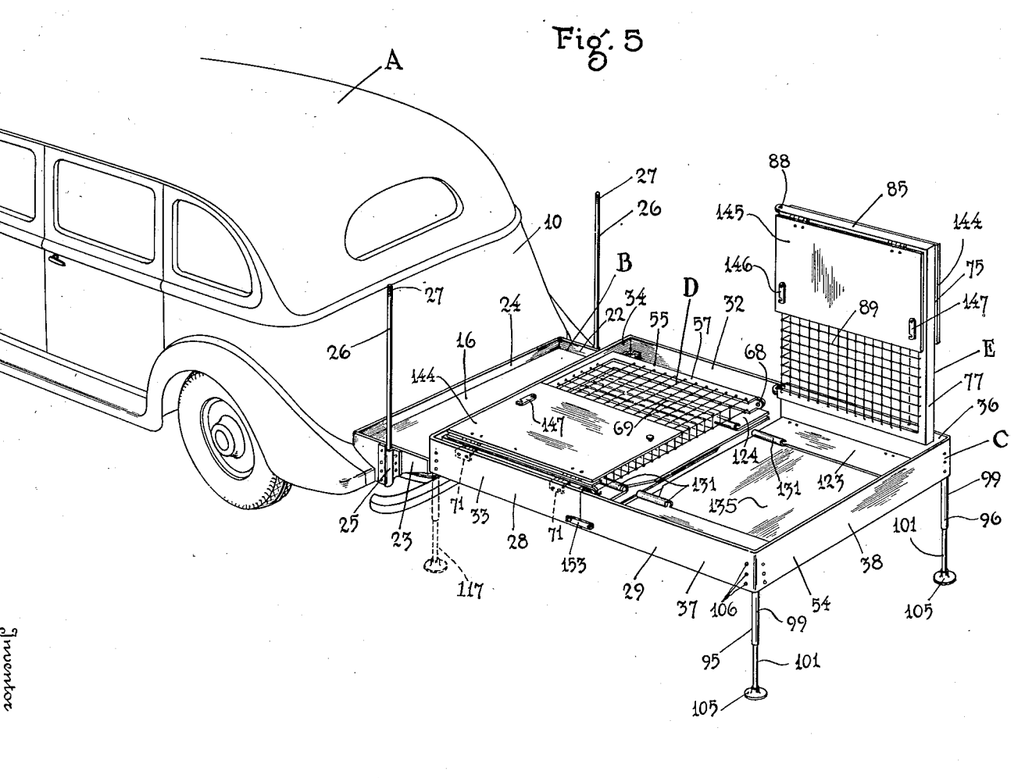
Fig. 5 is a view similar to Fig. 3 showing the device partly folded up.

For the purpose of illustrating the application of my invention, I have shown in Figs. 1, 3 and 5 a portion of an automobile A. This automobile is constructed in the ordinary manner and the construction thereof will not be described in detail with the exception of the rearward portion thereof to which the invention is attached. The rear portion of the body of the automobile A is indicated by the reference numeral 10 and is supported on a transversely extending frame member 11. Frame member 11 is carried on the extreme ends 12 of the two longitudinal frame members 13 of the vehicle chassis, being formed with end flanges 14 which are riveted to said longitudinal frame members by means of rivets 15. The frame member 11 is of sufficient strength and rigidity to support the fuel tank, bumper and such other structure as may be desired to be attached to the rearward portion of the vehicle and is also used to support my invention.

My invention proper comprises a rack B on which is mounted the trunk C. Within the trunk are disposed two beds D and E. When the entire structure is erected a tent indicated in its entirety by the reference numeral F is formed which shelters said beds. These various parts will now be described in detail.

The rack B consists of a shelf 16 which is formed at its ends with downwardly turned flanges 17. These flanges are riveted by means of rivets 21 to two side plates 22 and 23. At the forward portion of the shelf 16 is provided an upwardly extending flange 24. The two end plates 23 and 24 extend upwardly above the shelf 16 a sufficient distance to form end flanges which correspond to the front flange 24. The end plates 22 and 23 are provided with inwardly turned flanges 20 which are bolted to the cross frame member 11 of the vehicle chassis by means of bolts 30 whereby the rack is rigidly supported upon the frame of the vehicle.

At the sides of the end plates 23 and 24 are provided sockets 25 which receive two tie bolts 26 attached thereto and by means of which the trunk is held supported on the rack B. The upper ends of these tie bolts are threaded as indicated at 27 to receive wing nuts 30 by means of which the trunk is held in position.

Figure 2:
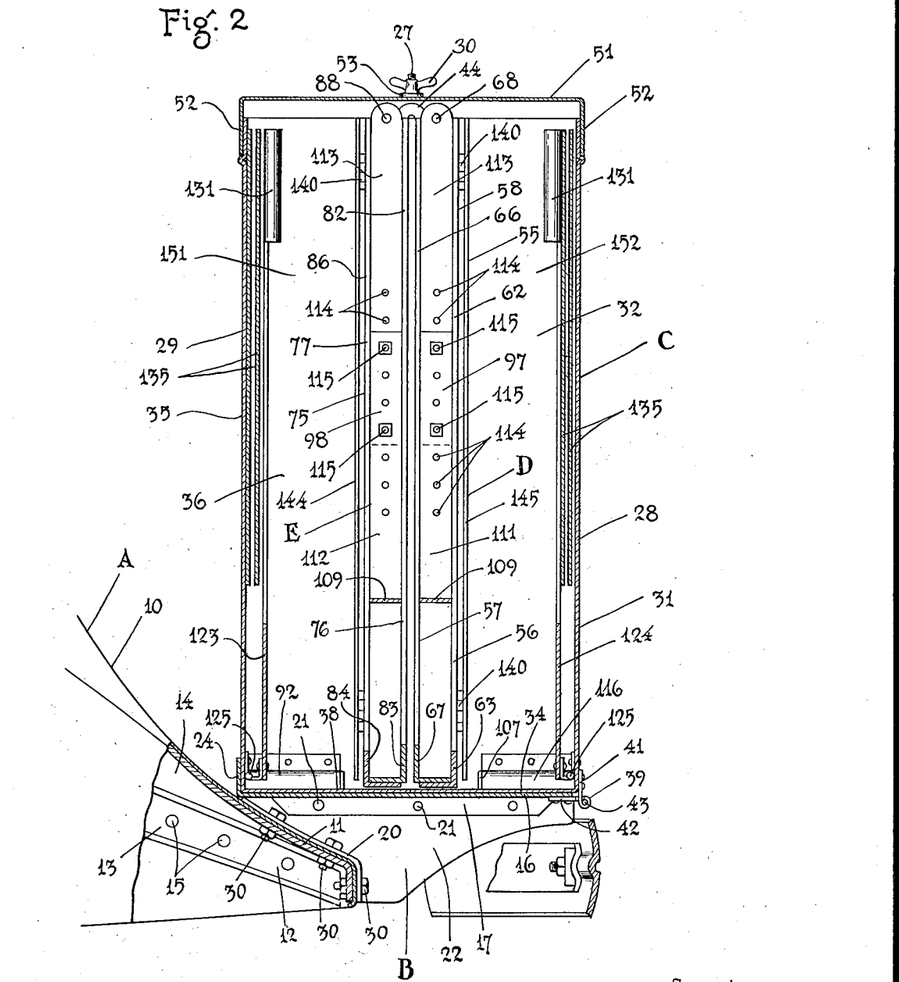
Fig. 2 is a sectional view taken transversely through the trunk shown in Fig. 1 and longitudinally of the vehicle.

The trunk C is constructed with two sections 28 and 29, the section 29 being disposed at the forward portion of the rack when the trunk is collapsed and the section 28 being disposed at the rearward portion of the rack. The arrangement of the parts when so shown is illustrated in Fig. 1. Trunk section 28 consists of a back 31, two end walls 32 and 33 and a bottom wall 34. These various walls may be welded or otherwise secured together as is well known in the sheet metal art. The trunk section 29 is similarly constructed and comprises a front 35, two end walls 36 and 37 and a bottom wall 38. These parts are secured to one another in a manner similar to the parts of the section 28. When the trunk sections are disposed in collapsed position, as shown in Figs. 1 and 2, the edges of the walls 36, 37 and 38 abut against the corresponding edges of the walls, 32, 33 and 34 and a trunk structure is formed which is closed on all the sides and bottom thereof, but which is open at the top. Where the material from which the trunk is constructed is of wood or metal of sufficient thickness, the edges of these various structures may abut one another and the structures held in abutting relation. Where, however, lighter sheet metal is used any of a number of different methods now well known in the art for the purpose may be employed to maintain proper alignment between the parts.

The trunk section 28 is hingedly connected to the plate 16 of rack B by means of two hinges 39. These hinges consist of hinge leaves 41 and 42 which are pivotally connected together by means of pintles 43. The hinge leaves 41 are attached to the rear wall 31 of said trunk section, while the hinge leaves 42 are attached to the shelf 16 of rack B. Pintles 43 are preferably removable so that the entire trunk may be removed from the rack whenever desired and without removing the rack itself.

Figures 4, 10:
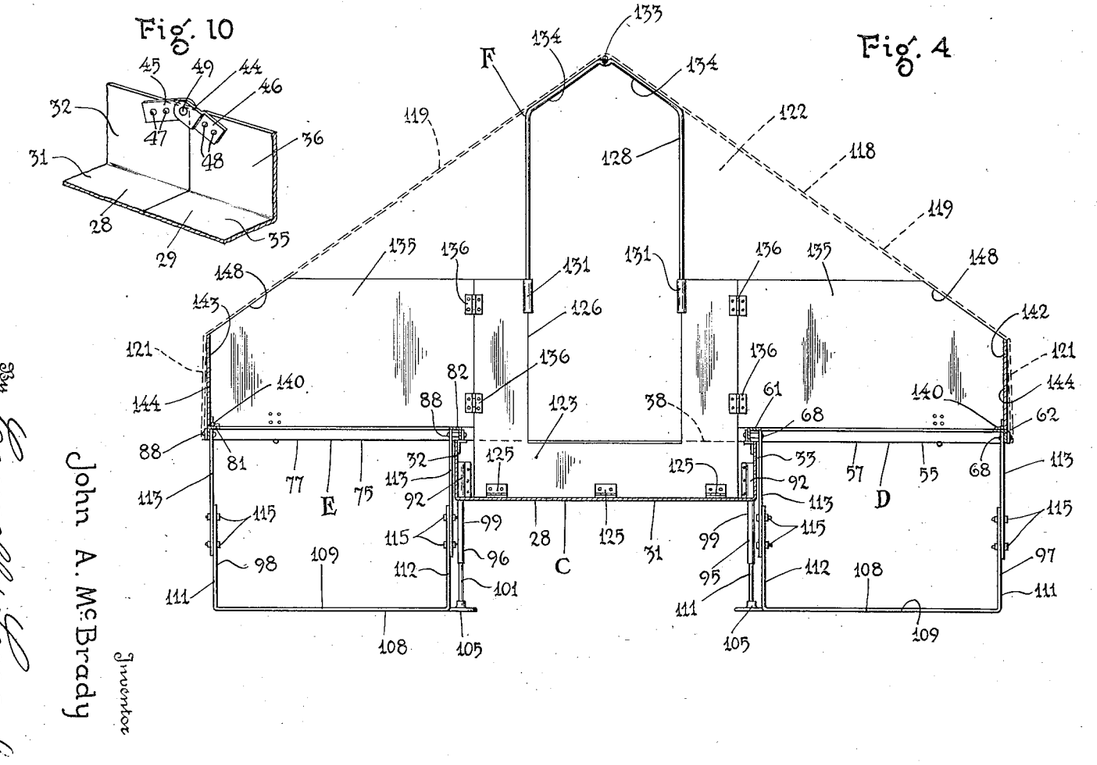
Fig. 4 is a transverse sectional view taken through the structure shown in Fig. 3 rearwardly of the center thereof and illustrating the position of the tent covering in dotted lines.
Fig. 10 is a perspective view of a portion of the trunk illustrating the hinge construction between the two trunk sections.

The two trunk sections are hingedly connected together at the open upper ends thereof by means of two hinges 44 illustrated in detail in Fig. 10. Both of these hinges being identical only the hinge used on the end of the trunk embodying walls 32 and 36 has been shown in detail. This hinge comprises two hinge leaves 45 and 46 which are riveted to the two walls 32 and 36 respectively of the trunk sections 28 and 29 by means of rivets 47 and 48. The hinge leaf 46 is somewhat offset so that the two hinge leaves overlie one another as illustrated. Extending through these hinge leaves is a rivet 49 which serves as a pintle. The axis of the pintle 49 is exactly at the vertex of the salient angles formed by the edges of the walls 32 and 36 so that the edges of said walls abut one another when the trunk sections are in either their collapsed or extended positions. By means of the particular construction described, the trunk may occupy the positions shown in full lines in Fig. 1 in which the trunk sections 28 and 29 are disposed with the free edges of the walls thereof in contact with one another. When the parts are so disposed the trunk section 29 is received within the flange 24 which assists in holding the two trunk sections closed. For closing the upper open end of the trunk sections, a cover 51 is employed which is constructed with a downwardly turned flange or lip 52 extending completely about the same. This flange receives the upper ends of the vertical walls of the trunk and holds the same in proper position. On the cover 51 are provided two outwardly extending lugs 53 through which the threaded ends 27 of the tie bolts 26 extend. The wing nuts 28 engage these lugs and force the cover 51 downwardly upon the trunk structure holding the trunk closed and securely attached to the rack B. It will be noted that by means of the particular hinge construction shown that the sections of the trunk may be swung from the positions shown in full lines in Fig. 1 through the position shown in dotted lines in Fig. 1 and to the position shown in full lines in Figs. 3 and 5. When in the latter position the trunk structure forms a box similar to a wagon box which has been designated in its entirety by the reference numeral 54 and which serves as a foundation on which the tent is erected. The front and back 31 and 35 of the trunk sections 28 and 29 form the bottom of the box 54 and also the floor of the tent. The various walls of the two trunk sections extend outwardly from the floor of the box 54 in an upward direction, as best shown in Fig. 5.

The bed D consists of a bed bottom 55 best shown in Fig. 3. This bed bottom is constructed in two parts 56 and 57 which are substantially identical in construction. The part 56 of bed bottom 55 consists of a frame 58 constructed with two parallel longitudinal frame members 61 and 62 and a cross frame member 63. These frame members are preferably constructed of angle stock and may be welded or otherwise secured together at their corners. The part 57 of bed bottom 55 consists of a frame 64 which is constructed with two longitudinal frame members 65 and 66 and connected together by a transverse frame member 67. The frame member 61 overlies frame member 65 and the frame member 62 overlies frame member 66. At the overlying portions of these flanges are provided rivets 68 which extend through the same and form hinges for hingedly connecting the parts of the bed bottom together. A bed spring 69 is secured to the frames 58 and 64. This bed spring may be of the wire link type or any other suitable construction such as is now well known in the art and which will readily fold at the center thereof. Such spring has only been shown diagrammatically in the drawings, though, as stated, it can readily be comprehended that any suitable type of spring may be used.

The bed bottom 55 is attached to the wall 33 of trunk section 28. This is accomplished by means of two hinges 71 shown in detail in Fig. 9. These hinges consist of hinge leaves 72 and 73 which are connected together by means of a pintle 74. The hinge leaves 71 are offset and are attached to wall 33 of trunk section 28, while the hinge leaves 72 are attached to the frame member 61 of frame 58. When the bed bottom 55 is erected as shown in Fig. 3, the frames 58 and 64 rest upon the edges of the walls 33 and 37 and are supported thereby. When the two parts 56 and 57 of the bed bottom 55 are folded together as shown in Fig. 5, the entire folded structure may be swung into the section 28 of the trunk.

The bed E is similarly comprised with a bed bottom 75 which is constructed in two parts 76 and 77. The part 76 includes a frame 78 which is formed with longitudinal frame members 81 and 82 connected together through a cross frame member 83. The part 77 of bed bottom 75 is likewise constructed with longitudinal frame members 85 and 86 which are connected together by means of a cross frame member 84. The two frame members 82 and 86 are pivotally connected together by means of a rivet 88 while the two frame members 81 and 85 are similarly connected together. A spring 89 similar to the spring 69 is carried by this frame and is adapted to be folded intermediate its length when the two frame sections are folded together. The frame member 86 of bed bottom 75 is hingedly connected by means of hinges 91 with the wall 36 of trunk section 29. These hinges are similar to the hinges 71. By means of this construction the bed bottom 75 may be folded in half and the folded structure swung into the trunk section 29 as shown in Fig. 2.

The trunk section 28 is supported forwardly on the shelf 16 and the trunk section 29 is supported rearwardly by means of two legs 95 and 96. At the center of the tent structure are provided two other legs 97 and 98 which are attached to the two bed bottoms 55 and 75 and which support the said bed bottoms and also support the two trunk sections intermediate the rearward and forward ends of the extended structure. Inasmuch as the legs 97 and 98 are identical in construction and likewise the legs 95 and 96, only the legs 96 and 97 will be described in detail.

The leg 96 is best shown in Fig. 6 and consists of a pipe 99 in which is mounted another pipe 101 adapted to telescope with respect to the same. The pipe 101 has a number of holes 102 drilled through the same whereas the pipe 99 has a single hole 103 drilled through it. A bolt 104 passing through these holes serves to hold the two pipes in vertically adjusted position. At the lowermost end of pipe 101 is screwed a flange 105 which serves as a base for the leg. The upper end of the pipe 99 is received in a socket 92 formed in the corner between the two walls 36 and 38 of the trunk section 29. This socket is constructed by means of a strip of sheet metal 93 which is bent as shown in Fig. 7 and is attached to the two walls 36 and 38 of trunk section 29 by means of rivets 106. An ear 107 at the upper end of the member 93 forms a stop against which the pipe 99 abuts and serves to support the trunk section on the leg 96.

The leg 97 consists of a U-shaped bar 108 which is constructed with a base portion 109 and with upstanding portions 111 and 112. These portions have attached to them extensions 113 and the said extensions are provided with holes 114 through which bolts 115 may extend for the purpose of adjusting the heights of the said legs. The extensions 113 are pivoted on the rivets 68 which pivotally connect the two frames 58 and 64 of bed bottom 55 together. The width of the bars from which the legs 97 and 98 are constructed is substantially equal to or slightly less than the width of the flanges of the angles from which the frames of the bed bottoms are constructed so that said legs may be received between the frames of the bed bottoms when the same are folded into overlying position as shown in Fig. 2. When so arranged, the legs 97 and 98 are entirely out of the way and held in position between the two parts of the springs of the said bed bottom.

If desired, the entire structure may be detached from the automobile and supported independently thereof. For this purpose sockets 116 similar to the sockets 92 are provided in the forward corners of the trunk structure, which sockets are adapted to receive legs 117 shown in dotted lines in Fig. 5. The said legs may, if desired, be dispensed with when the structure is attached to the vehicle or the same may be utilized to prevent the tent from tilting forwardly through the yielding of the springs of the vehicle when weight is applied to the floor of the box 54.

As previously stated, the box 54 forms a foundation on which the tent F is built. The tent F consists primarily of a tent covering 118 shown in dotted lines in Fig. 4 which may be constructed of canvas, fabric, or any other suitable material and which is preferably shaped to form a wall tent. This tent is constructed with a roof portion 119 and with wall portions 121 at the lowermost portions thereof. The roof portion 119 is closed at its end by means of flaps 122 which are constructed in the usual manner. Inasmuch as the invention does not reside in the specific construction of the tent covering, the same has not been illustrated in detail in the drawings, though it can be readily comprehended that any type of tent covering such as is now well known in the art may be employed.

For supporting the tent covering 118, two end panels 123 and 124 are utilized which are attached to the front 35 and back 31 respectively of the two trunk sections 29 and 28, by means of hinges 125. These panels are narrower than the width of the box 54 so that the same may be folded within the trunk sections in a manner to lie upon the front and back thereof. The two panels 123 and 124 are disposed in close proximity to the bottom walls 38 and 34 of the trunk sections and engage said bottom walls when in erected position, movement of said panels outwardly with respect to the trunk sections being limited thereby. The panels 123 and 124 are formed at the centers thereof with openings 126 and 127 which serve as doorways by means of which entrance may be had into the tent. Sraddling these openings are U-shaped uprights 128 and 129 which are received in sockets 131 formed in the upper portions of said end panels at the edges of the openings 126 and 127. A sectional ridge pole 133 is disposed between the two uprights 128 and 129 and is removably attached to the same. The tent covering 118 rests upon the ridge pole 133 and upon inclined portions 134 of uprights 128 and 129, and is supported at its center thereby.

Hingedly connected to the outer edges of the end panels 123 and 124 by means of hinges 136 are wings 135 which are adapted to swing outwardly therefrom and to lie in continuation of said end panels as shown in Fig. 3. These wings are disposed immediately above the cross frame members of the two bed bottoms and are attached thereto by means of a construction shown in detail in Fig. 8. Attached to each of said wings are two eyes 137 in which is slidably mounted a bolt 138. This bolt is formed at the lower end of the same with a finger 139 which is adapted to engage beneath the particular cross frame member and to hold the said wings attached to said frame member. A thumb piece 141 at the upper end of the bolt engages the upper eye 137 and restrains longitudinal movement of the bolt downwardly. By means of this thumb piece the bolt may be turned to disengage the finger 139 from the bed bottom. The wings 135 are of a width less than the width of the trunk and when folded are adapted to overlie the end panels to which they are attached and to lie flat against the front and back of the two trunk sections as shown in Fig. 2.

In addition to the end panels 123 and 124 the tent is provided with side panels 142 and 143. These side panels are formed in two parts indicated by the reference numerals 144 and 145. These parts are hingedly connected to the outer frame members of the bed bottoms 55 and 75 by means of hinges 140 and are held attached to one another through fasteners 146 and to the adjoining wings 135 through other fasteners 147. The tent covering 118 is supported at its outer extremities through the panels 142 and 143 and is partly supported on inclined edges 148 formed on the wings 135. The covering 118 may be constructed so as to be attached to the wings 135, end panels 123 and 124 and the side panels 143 and 144 at the upper edges of the same or the tent covering may extend downwardly to the bed bottoms and be attached thereto. In either event suitable fasteners are employed for the purpose. Such construction forming no particular feature of the invention, has not been shown in detail, though it can readily be comprehended that snap fasteners, buckles or any other suitable fastening means may be employed for the purpose. The flap 122 of the tent covering is constructed with openings registering with the openings 127 and 126 in the end panels 123 and 124 and may also be provided with curtains serving as doors for closing the entrance into the tent.

The manner of operation of the invention is as follows: When the parts are folded and collapsed as shown in Fig. 2, spaces 151 and 152 are provided between the respective bed bottoms and end panels attached to the respective sections. In these spaces are disposed the covering 118 of the tent and whatever bedding the camper wishes to enclose within the trunk together with the legs or other detachable parts of the tent structure. When it is desired to pitch the tent wing nuts 28 are unscrewed and the cover 51 removed. The trunk structure may then be swung through the position shown in dotted lines in Fig. 1 to a position such as shown in Fig. 5. For the purpose of temporarily holding the two trunk sections extended, latches 153 are employed which are attached to the two trunk sections and which are moved into latching position when the trunk sections are in alignment. After these latches have been applied the two legs 95 and 96 are mounted in the sockets 92 and adjusted for height to level up the floor of the box 54. The bed D is next swung outwardly and the two parts 56 and 57 of bed bottom 55 swung into alignment as the parts are extended. With the bed bottom in the position shown in Fig. 3 the leg 97 may be swung downwardly to support the bed bottom and the trunk near the center of the same. Leg 97 in such position takes the strain off from the latches 153. Bed E is next extended and supported in the same manner. After these parts are in proper position the two end panels 123 and 124 are erected and the U-shaped uprights 128 and 129 attached to the same. Thereafter the ridge pole 133 may be secured to the upper portions of these uprights. The uprights and end panels are now held in proper position through engagement of said end panels with the bottom walls of the trunk sections. Wings 135 are now swung outwardly and the bolts applied to attach said wings to the bed bottoms. Thereafter the parts 144 and 145 of the side panels 142 and 143 are erected and attached to the wings and to one another by means of the fastening devices 146 and 147. The covering 118 may now be applied to the entire structure and is attached thereto in the customary manner. The beds may now be made and the tent and beds are ready for use. In the collapsing of the device and the packing of the same within the trunk, the reverse procedure is adopted. After the trunk is ready to be closed the legs and other loose parts may be inserted into the vacant spaces within the trunk provided for the purpose. It will be noted that the bed bottoms are of a width somewhat less than the width of the trunk sections to allow spaces at the lateral edges of the bed bottoms in which the legs and other parts of the tent may be placed.

My invention is highly advantageous in that an extremely simple and practical construction is provided by means of which a complete tent having two beds may be conveniently collapsed and packed into a trunk structure which forms part of the tent. The device is practically foolproof. The device is extremely simple to operate and when erected serves the desired purpose. Due to the fact that the entire tent is off from the ground, moisture conditions of the ground have no effect upon the comfort of the occupants. The entire trunk can be readily removed from the automobile whenever desired and the tent when erected can be erected and partly supported through the vehicle or supported independently thereof. There are no complicated or intricate parts of the invention to get out of order and the device will function indefinitely without attention.

Changes in the specific form of my invention, as herein disclosed, may be made within the scope of what is claimed without departing from the spirit of my invention.

Having described my invention, what I claim as new and desire to protect by Letters Patent is:

1. A trunk for application to an automobile having a rack at the rearward portion thereof, said trunk comprising two sections, one of said sections being formed with a vertical back and forwardly extending end walls and a bottom wall, the other of said sections being formed with a front and with rearwardly extending end and bottom walls extending in coplanar relation with respect to the end and bottom walls of said first named section and forming in conjunction therewith ends and a bottom for said trunk, said trunk being open at the top, means for hingedly connecting said first named section to the rack in proximity to the corner formed between said rear wall and bottom wall thereof, means for hingedly connecting said sections together at the upper ends of the end walls of said section and in proximity to the line of joinder thereof, and means for supporting said sections with the front and rear walls thereof in coplanar horizontal position.

2. In combination, a trunk comprising two trunk sections hingedly connected together and adapted to swing into extended or folded relation, the trunk sections when in extended relation forming a floor for a tent, end panels secured to said trunk sections and adapted to extend upwardly therefrom when the trunk sections are in extended relation, said end panels being adapted to be received between said trunk sections when the trunk sections are in folded relation, and a tent covering supported in erected position by said end panels.

3. In combination, a trunk comprising two trunk sections hingedly connected together and adapted to swing into extended or folded relation, the trunk sections when in extended relation forming a floor for a tent, end panels secured to said trunk sections and adapted to extend upwardly therefrom when the trunk sections are in extended relation, said end panels being adapted to be received between said trunk sections when the trunk sections are in folded relation, a tent covering supported in erected position by said end panels, bed bottoms secured to said trunk sections and extending outwardly therefrom when the trunk sections are in extended relation, and wings secured to said end panels and connected to said bed bottoms for supporting the outermost portions thereof.

4. In combination, a trunk comprising two trunk sections hingedly connected together and adapted to swing into extended or folded relation, the trunk sections when in extended relation forming a floor, a bed bottom formed in two parts hingedly connected together and adapted to swing into overlying or coplanar relation, means for hingedly connecting one of said parts to one of said trunk sections on one side of the trunk, a second bed bottom formed in two parts hingedly connected together and adapted to swing into overlying or coplanar relation, means for hingedly connecting the opposite part of said second bed bottom to the other trunk section on the opposite side of the trunk, said bed bottoms being adapted to project outwardly from said trunk sections and lying in a common plane parallel to the plane of the extended trunk sections and to be folded into overlying position and each containing within its respective trunk section, and means for supporting said trunk sections and bed bottoms in extended position.

5. A trunk for application to an automobile having a rack at the rearward portion thereof, said trunk comprising two trunk sections formed with a back and a front and with complemental walls constituting ends and a bottom for the trunk, means for hingedly connecting the section having the rear wall to the rack at the rearward portion thereof, means for hingedly connecting the two trunk sections together at the uppermost portions thereof and in proximity to the line of joinder of said trunk sections, said trunk sections being swingable from a position in which the front and back are in spaced vertical relation, to a position in which the front and back are in coplanar horizontal relation, two bed bottoms, each constructed with two parts hingedly connected together and adapted to be disposed in extended coplanar relation or to be folded into overlying relation, one of the parts of one of said bed bottoms being hingedly connected to a wall of one of said trunk sections, the other part of the other of said bed bottoms being connected to the opposite wall of the other trunk section, said parts of said bed bottoms being foldable to bring one of said folded bed bottoms within one of said trunk sections and the other of said folded bed bottoms into the other of said trunk sections, the walls on one of said trunk sections being of sufficient height when the trunk sections are folded to leave a space between the folded bed bottom and the said trunk section, and means for holding the trunk sections and bed bottoms in extended position.

6. In combination, a trunk comprising two trunk sections formed with a front and a back and complemental walls providing ends and a bottom for the trunk, said trunk sections being hinged together to swing in a manner to bring said front and back into coplanar relation with said walls issuing outwardly therefrom in the same direction, a bed bottom constructed of two parts foldable into extended or overlying relation, one of said parts being hingedly connected to one of the end walls of one of said sections and being swingable when folded to lie within said trunk section, end panels hingedly connected to the front and back of said trunk sections and adapted to lie upon the front and back when in folded position, the walls of one of said trunk sections being of sufficient height when the trunk sections are folded to provide a space between said end panels and bed bottom.

7. In combination, a trunk comprising two trunk sections formed with a front and a back and complemental walls providing ends and a bottom for the trunk, said trunk sections being hinged together to swing in a manner to bring said front and back into coplanar relation with said walls issuing outwardly therefrom in the same direction, a bed bottom constructed of two parts foldable into extended or overlying relation, one of said parts being hingedly connected to one of the end walls of one of said sections and being swingable when folded to lie within said trunk section, end panels hingedly connected to the front and back of said trunk sections and adapted to lie upon the front and back when in folded position, said end panels being foldable against said bottom walls, and a ridge pole carried by said end panels for holding the same against said bottom walls.

8. In combination, a trunk comprising two trunk sections formed with a front and a back and complemental walls providing ends and a bottom for the trunk, said trunk sections being hinged together to swing in a manner to bring said front and back into coplanar relation with said walls issuing outwardly therefrom in the same direction, a bed bottom constructed of two parts foldable into extended or overlying relation, one of said parts being hingedly connected to one of the end walls of one of said sections and being swingable when folded to lie within said trunk section, end panels hingedly connected to the front and back of said trunk sections and adapted to lie upon the front and back when in folded position, said end panels being foldable against said bottom walls, said end panels being of less height than the height of a tent, one of said end panels having an opening at the center thereof forming a doorway, a U-shaped upright secured to said end panel and straddling said opening, a ridge pole supported at one end by said upright, means for supporting said ridge pole at its other end from the other end panel, and a tent covering carried by said ridge pole.

9. In combination, a trunk comprising two trunk sections formed with a front and a back and complemental walls providing ends and a bottom for the trunk, said trunk sections being hinged together to swing in a manner to bring said front and back into coplanar relation with said walls issuing outwardly therefrom in the same direction to form a box constituting the floor of a tent, end panels hinged to said front and back in proximity to the bottom walls thereof and swingable into said trunk sections to lie along said front and back, wings hingedly connected to the end panels and adapted to extend outwardly therefrom or to be disposed in overlying relation with respect thereto, and a tent covering carried by said end panels and held in extended position by said wings.

10. In combination, a trunk for application to an automobile having a support thereon, said trunk comprising two trunk sections, one of said trunk sections being provided with end walls, a bottom wall, and a front, the other of said trunk sections being provided with end walls, a bottom wall and a back, hinge means for pivotally connecting said trunk sections together, said means having its axis extending substantially through the outermost upper corners of the end walls of the sections, and other hinge means for pivoting said section having the back to the support, said means having its axis extending parallel to the intersection of said back and the bottom wall connected therewith and disposed in close proximity thereto, said two hinge means guiding the trunk sections for swinging movement from a position in which both trunk sections extend vertically adjacent one another with the edges of the end and bottom walls in substantial abutment and with the back and front in spaced relation to form an enclosure to a position in which the back and front lie horizontally in extended coplanar relation with the end and bottom walls extending upwardly therefrom.

11. In combination, a trunk for application to an automobile having a support thereon, said trunk comprising two trunk sections, one of said trunk sections being provided with end walls, a bottom wall, and a front, the other of said trunk sections being provided with end walls, a bottom wall and a back, hinge means for pivotally connecting said trunk sections together, said means having its axis extending substantially through the outermost upper corners of the end walls of the sections, other hinge means for pivoting said section having the back to the support, said means having its axis extending parallel to the intersection of said back and the bottom wall connected therewith and disposed in close proximity thereto, said two hinge means guiding the trunk sections for swinging movement from a position in which both trunk sections extend vertically adjacent one another with the edges of the end and bottom walls in substantial abutment and with the back and front in spaced relation to form an enclosure to a position in which the back and front lie horizontally in extended coplanar relation with the end and bottom walls extending upwardly therefrom, and a bed bottom hingedly connected to one of the end walls at one end of the trunk, and a second bed bottom hingedly connected to one of the end walls at the other end of the trunk.

12. In combination, a trunk comprising two trunk sections formed with a front and a back and complemental walls providing ends and a bottom for the trunk, hinge means at the outer corners of said end walls for guiding said trunk sections to swing in a manner to bring said front and back into coplanar relation with said walls issuing outwardly therefrom in the same direction, a bed bottom constructed of two parts foldable into extended or overlying relation, one of said parts being hingedly connected to one of the end walls of one of said sections and being swingable when folded to lie within said trunk section, and a second bed bottom constructed of two parts foldable into extended or overlying relation, one of the parts of the second bed bottom being hingedly connected to one of the end walls at the other end of the trunk, said bed bottoms when in extended position being in spaced coplanar relation and said trunk sections when extended providing a platform between said bed bottoms.

13. In combination, a trunk comprising two trunk sections hingedly connected together and adapted to swing into extended or folded relation, the trunk sections when in extended relation forming a floor for a tent, end panels secured to said trunk sections and adapted to extend upwardly therefrom when the trunk sections are in extended relation, said end panels being adapted to be received between said trunk sections when the trunk sections are in folded relation, a tent covering partly supported in erected position by said ends panels, bed bottoms secured to said trunk sections and extending outwardly therefrom when the trunk sections are in extended relation, and other panels hingedly connected to said bed bottoms and adapted to be swung upwardly therefrom to assist in enclosing said bed bottoms.

JOHN A. McBRADY.